United States Patent [19]

Schweiker

[11] Patent Number: 5,327,678

[45] Date of Patent: Jul. 12, 1994

[54] EXTENDABLE SUPPORT POST FOR POTTED PLANTS

[76] Inventor: James H. Schweiker, 14415 N. 73rd St., Suite 109A, Scottsdale, Ariz. 85260

[21] Appl. No.: 93,487

[22] Filed: Jul. 19, 1993

[51] Int. Cl.⁵ .............................................. A01G 9/12
[52] U.S. Cl. ............................................ 47/70; 47/47
[58] Field of Search ............ 47/66 D, 70, 47 L, 47 S, 47/44 L

[56] References Cited

U.S. PATENT DOCUMENTS

| 1,556,373 | 10/1925 | Thoeni | 47/47 S |
| 3,165,863 | 1/1965 | Duran | 47/70 |
| 3,471,968 | 10/1969 | Letz . | |
| 4,020,592 | 5/1977 | Saunders . | |
| 4,173,098 | 11/1979 | Smith | 47/70 |

FOREIGN PATENT DOCUMENTS

| 0494482 | 7/1992 | European Pat. Off. | 47/70 |
| 3727463 | 5/1988 | Fed. Rep. of Germany | 47/66 D |
| 4120745 | 12/1991 | Fed. Rep. of Germany | 47/70 |
| 2558682 | 8/1985 | France | 47/70 |
| 278851 | 11/1951 | Switzerland . | |
| 342400 | 12/1959 | Switzerland . | |
| 790369 | 2/1958 | United Kingdom | 47/47 S |
| 2191673 | 12/1987 | United Kingdom | 47/70 |

Primary Examiner—Ramon S. Britts
Assistant Examiner—Joanne C. Downs
Attorney, Agent, or Firm—Warren F. B. Lindsley

[57] ABSTRACT

An improved support for potted plants comprising a vertical post formed of one or more hollow sections secured to a horizontal apertured anchor plate. The anchor plate, which rests on the bottom of the pot, is held in place by the weight of the soil in the pot. The vertical post is extendable in length by the addition of post segments. The section of the post in the pot is apertured to provide feeding ports for the plant and the sections are interconnected by a coupling having tabs extending laterally thereof for anchoring plant ties.

4 Claims, 1 Drawing Sheet

U.S. Patent
July 12, 1994
5,327,678
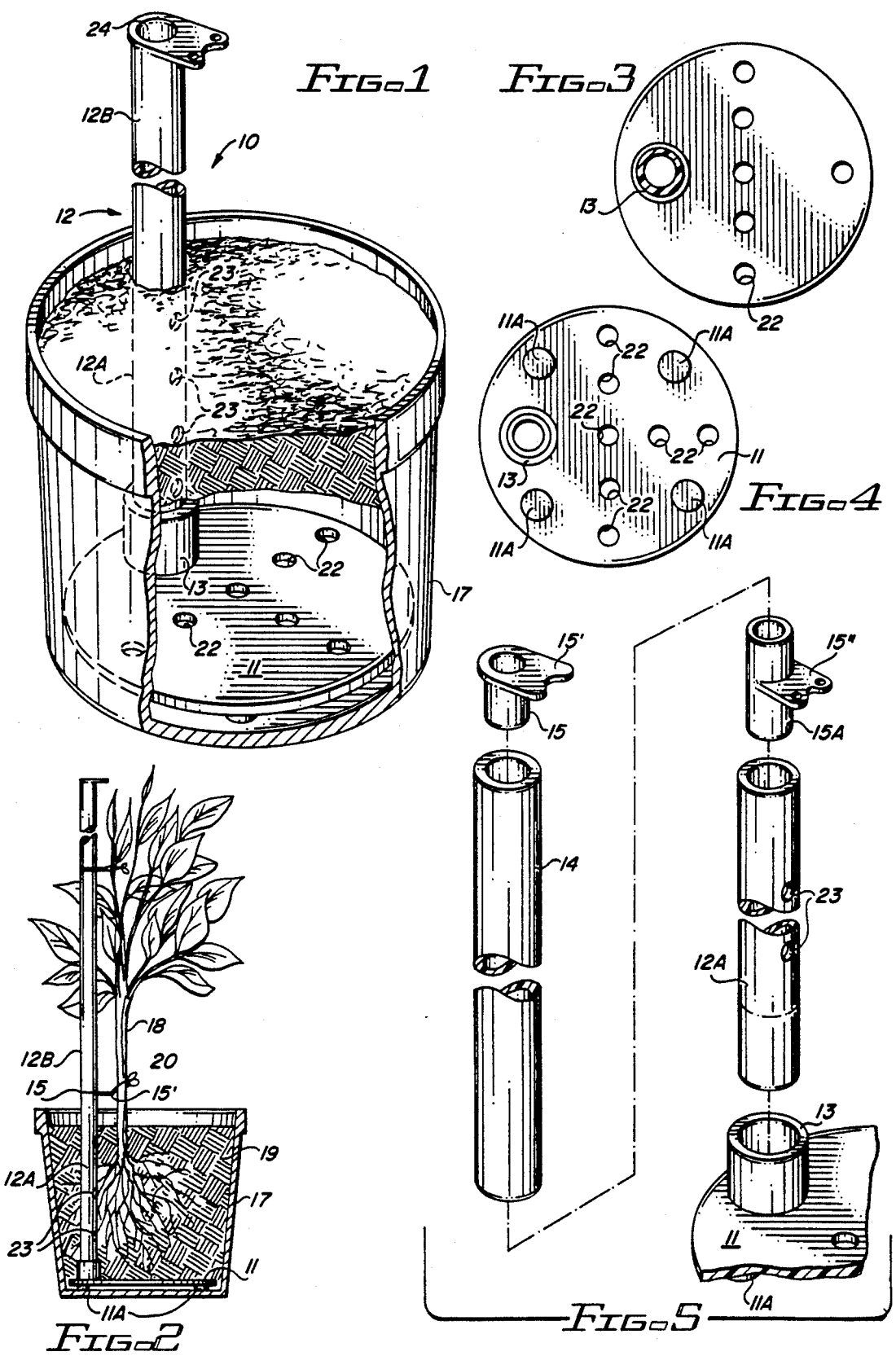

EXTENDABLE SUPPORT POST FOR POTTED PLANTS

BACKGROUND OF THE INVENTION

Many varieties of potted plants require some kind of mechanical support. This is true for vines, young trees and other types of indoor plants.

The ordinary wooden stake or slender stick typically employed for this purpose is not satisfactory, since the loose potting soils in which such plants are grown do not firmly anchor the stake. As a result, the stake is loosely supported and shifts out of the desired position for supporting the plant.

Further, as the plant grows, the original stake becomes too short for the plant and needs to be replaced with a longer one. While the original stake may by this time have stabilized with the settling of the soil, the newly installed stake will now present the same problem of instability that was encountered with the first stake.

There is also the possibility of root damage that occurs each time a stake is driven into the soil adjacent the plant. Some plants are especially sensitive to such damage, and the stake replacement operation should be avoided where possible.

Another problem involving plant damage that is not attributable directly to the present staking method may be alleviated through the use of the improved plant support of this invention. The damage, in this case, is that which occurs in connection with repotting. In the process of removing the plant from the original container, it is typically noted that after digging around the edge of the pot, it is still necessary to pry the root ball loose or to pull on the plant by its trunk in order to dislodge it from the pot. As this is done, the loose potting soil falls away from the root of the plant, and the roots of the plant may be torn or seriously disturbed. Further damage may occur as the plant is installed in the larger container and again in the restaking operation.

What is needed, then is a type of hollow plant feeding support that may be more securely anchored in the loose potting soil medium and used for watering the plant at various levels in the pot. The length of the support should be extendable, so that replacement of the support will not be required as the plant grows and the support provides tie supports along its length.

DESCRIPTION OF THE PRIOR ART

Although the following patents are of interest, none of them individually or in combination disclose the extendable plant support and feeding structure disclosed.

Switzerland Patent No. 278,851 discloses a hollow plant stake attached to a foot and illustrating ties for attachment to the stem of a plant.

Switzerland Patent No. 342,400 discloses a support for potted plants of various lengths formed by interconnected sections having an apertured foot thereof extending laterally thereof for fitting in the base of the plant.

U.S. Pat. No. 3,471,968 discloses a telescoping plant support and watering device adapted to be placed in the open ground or in a flower pot and is adjustable to the height of a growing plant.

U.S. Pat. No. 4,020,592 discloses a plant support which provides both a reservoir for receiving excess water from the planter and an extendable plant support.

SUMMARY OF THE INVENTION

In accordance with the invention claimed, a combination plant support and watering stake for potted plants is disclosed which is provided with an extendable stem for selective and sequence adjustment to the growing plant. The stake filters the water to the base of the plant beneath the top surface of the soil in the pot and is also provided with tabs along the length the stake for tying the plant to the stake.

It is, therefore, one object of this invention to provide a new and improved plant support or stake for supporting and watering potted plants.

Another object of this invention is to provide a plant support and watering device for potted plants employing an extendable stem having tabs positioned along its length for supporting the plant in the pot.

A further object of this invention is to provide a plant support and watering device for potted plants which distributes water evenly about the roots of the plant.

A still further object of this invention is to provide a circular base for an offset stake for supporting a series of axially connected tubes for placement in the bottom of a known flower pot.

Another object of the invention is to provide in such a plant support a means whereby the length or height of the support may be adjusted without removing the support from the soil.

A further object of the invention is to provide in such a plant support a stabilizing or anchoring means which will secure the position of the support even when it is installed in loose potting soil.

A further object of this invention is to provide an expandable support for potted plants that provides a connector employing a tab at the ends of each attachable section for use in tying the plant to the stake.

Yet another object of the invention is to provide such a plant support in a form that is inexpensive to manufacture, so that it will be readily accepted in the marketplace.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described by reference to the accompanying drawing in which:

FIG. 1 is a perspective view partially broken away illustrating a combination feed and support stake and embodying the invention;

FIG. 2 is a cross sectional view of a pot showing the stake positioned in the pot and supporting a plant;

FIG. 3 is a top view of the supporting base of the stake;

FIG. 4 is a bottom view of the supporting base of the stake; and

FIG. 5 is an exploded perspective view of the feed and support stake shown in FIGS. 1 and 2.

DESCRIPTION OF THE PREFERRED EMBODIMENT

Referring more particularly to the drawing by characters of reference, FIGS. 1 and 2 disclose an improved plant support 10 comprising a stabilizing means or anchor plate 11 and a plurality of cylindrical post sections or segments, for example, 12A and 12B which are coupled together to form a cylindrical post 12 mounted to extend laterally from anchor plate 11.

The base or anchor plate 11 is preferably in the form of a flat disc; as shown; but other shapes such as square or rectangular may be employed for use with pots of different shapes. The surface may be continuous or perforated, as shown in FIG. 2, for special use. Permanently attached to or integral with the top surface of anchor plate 11, preferably at a location near its periphery, is a projection 13 extending laterally of plate 11 which serves as a means for attaching the first segment 12A of post 12 to plate 11.

Each of the segments 12A, 12B of post 12 comprises a stem 14 and a coupler 15 comprising a tab 15'. Stem 14 and coupler 15 may be integral or permanently secured together or they may be separable, as a section of rigid plastic hollow tubing and an associated coupler 15.

Post 12 is preferably fastened securely to anchor plate 11. In FIG. 3, projection 13 and coupler 15 are thread connected. The two parts, however, may be cemented together by suitable glue or the like.

While segment 12A should be securely attached to anchor plate 11, as just described, additional segments such as segment 12B may be added by simply telescopically frictionally engaging the parts for holding them in place and/or by use of couplers for interconnecting the sections.

As shown in FIG. 1, support 10 is installed and arranged to extend vertically outwardly of pot 17 with base or anchor plate 11 and its feet or pads 11A resting on the bottom of the pot. Plant 18 is then placed in pot 17 over anchor plate 11. The trunk of the plant may then be secured by means of strings or ties 20 to tabs 15' of coupler 15.

The full weight of potting soil 19 resting on anchor plate 11 securely stabilizes the position of plate 11 and post 12, so that the position of post 12 is rigidly secured from the moment the potting of the plant is completed. At the time of potting when the plant is small, only the first segment 12A of post 12 may be required. When the plant grows to a height too tall for adequate support by segment 12A, another segment 12B may be added. Additional segments may be added as the plant continues to grow. In this way, the height of the support is readily adjusted without removal of the original support and without damage to the plant.

The plant may be lifted out of pot 17 after a knife has been employed to separate the periphery of the soil, root cylinder or ball from the vertical sides of the pot. The plant is lifted by grasping segment 12A of post 12. The compacted potting soil and root ball rest on anchor plate 11. The firmly attached segment 12A passing through root ball 21 stabilizes the position of the root ball on the anchor plate as it is lifted from pot 17; and there is thus little or no tendency for the soil and root ball to slip or fall away from plate 11.

Anchor plate 11 is perforated by a number of holes 22, as shown in FIGS. 1, 3 and 4 to aid in drainage during plant growth. As the plant continues to grow, its roots may now extend through holes 22 in the perforated anchor plate 11.

As noted from FIGS. 1 and 2, section 12A of post 12 is provided with a plurality of holes 23 which are used for providing outlet ports at different levels in the pot for watering and plant feeding purposes. The watering and feeding occurs by pouring the water or liquid feed into opening 24 in the open end of section 12B through the hollow interior of stake or post 12 and out of openings or holes 23 into soil 24 in pot 17.

The entire support 10, including anchor plate 11 and post 12, may be made of plastic using inexpensive molding or extruding operations.

As noted from FIG. 5, couplers 15 and 15A are provided for telescopically fitting into the openings of sections 12A and 12B of post 12. Tab 15' may be cemented to coupler 15 or molded with it to form a single item. This also applies to coupler 15A and its associated tab 15''.

An improved support for potted plants is thus provided in accordance with the stated objects of the invention. The support is extendable; it anchors securely, even in loose potting soil; and it serves as a valuable aid during reporting operations, so that damage to the plant which has heretofore occurred during restaking and repotting operations may be virtually eliminated.

Although but a single embodiment of the invention has been illustrated and described, it will be apparent to those skilled in the art that various changes and modifications may be made therein without departing from the spirit of the invention or from the scope of the appended claims.

What is claimed is:

1. An extendable potted plant support and watering device comprising:
    two or more hollow tubular interconnected sections one of which is secured to an apertured base member adapted to be placed within a pot for plants to extend laterally of the longitudinal axis of said sections and juxtapositioned to the inside surface of the base of the pot with said sections positioned in a vertical array,
    said one of said sections having openings therethrough for providing fluid communication between all of said sections and the interior of the pot,
    said sections being interconnected by a coupling, and said coupling comprising an apertured tab for receiving through the apertures in the tab ties for surrounding the stock of a plant.

2. The extendable potted plant support and watering device set forth in claim 1 wherein:
    at least a pair of said apertured tabs are spacedly arranged along the length of said sections.

3. The extendable potted plant support and watering devices set forth in claim 1 in further combination with:
    pad means spacedly positioned on the bottom of said base member for spacing said base member a predetermined distance from the inside surface of the base of said pot.

4. The extendable potted plant support set forth in claim 1 wherein:
    said apertured tab comprises a flat apertured U-shaped plate extending laterally outwardly of the longitudinal axis of said coupling.

* * * * *